United States Patent [19]
Anderson

[11] Patent Number: 5,487,612
[45] Date of Patent: Jan. 30, 1996

[54] SHAFT SUPPORTING BEARING ASSEMBLY WITH AXIALLY DISPOSED CAP AND BALL MEMBER

[76] Inventor: Ronald L. Anderson, 410 Chambers St., Eugene, Oreg. 97402

[21] Appl. No.: 345,130

[22] Filed: Nov. 28, 1994

[51] Int. Cl.⁶ .................................................. F16C 19/00
[52] U.S. Cl. .............................. 384/501; 384/610
[58] Field of Search ........................ 384/501, 610, 384/519, 616, 617, 540

[56] References Cited

U.S. PATENT DOCUMENTS

| | | | |
|---|---|---|---|
| 405,559 | 6/1889 | Johansson . | |
| 931,069 | 8/1909 | Larrabee . | |
| 935,452 | 9/1909 | Backstrom . | |
| 1,088,839 | 3/1914 | Pratt et al. . | |
| 2,127,196 | 8/1938 | Worley | 308/159 |
| 4,265,498 | 5/1981 | Luce et al. | 308/230 |
| 4,278,097 | 7/1981 | Anderson | 130/5 |
| 4,618,273 | 10/1986 | Gotz et al. | 384/606 |
| 4,805,432 | 2/1989 | Paulhac | 72/164 |
| 4,865,529 | 9/1989 | Sutton et al. | 417/409 |
| 5,209,055 | 5/1993 | Hini et al. | 384/610 |

*Primary Examiner*—Lenard A. Footland
*Attorney, Agent, or Firm*—James D. Givnan, Jr.

[57] ABSTRACT

Bearing rings are carried one each in a shaft end and in a cap and seat against a ball element therebetween. Preloading of each ball element at the shaft ends is achieved by rotation of the cap along a threaded end segment of a bushing of a bearing assembly. A set screw on the cap seats against a circular wall of the bearing assembly for infinite bearing adjustment. A sealed chamber for lubricant is defined by the cap and permits direct application of lubricant to the ball element at each end of the shaft.

10 Claims, 1 Drawing Sheet

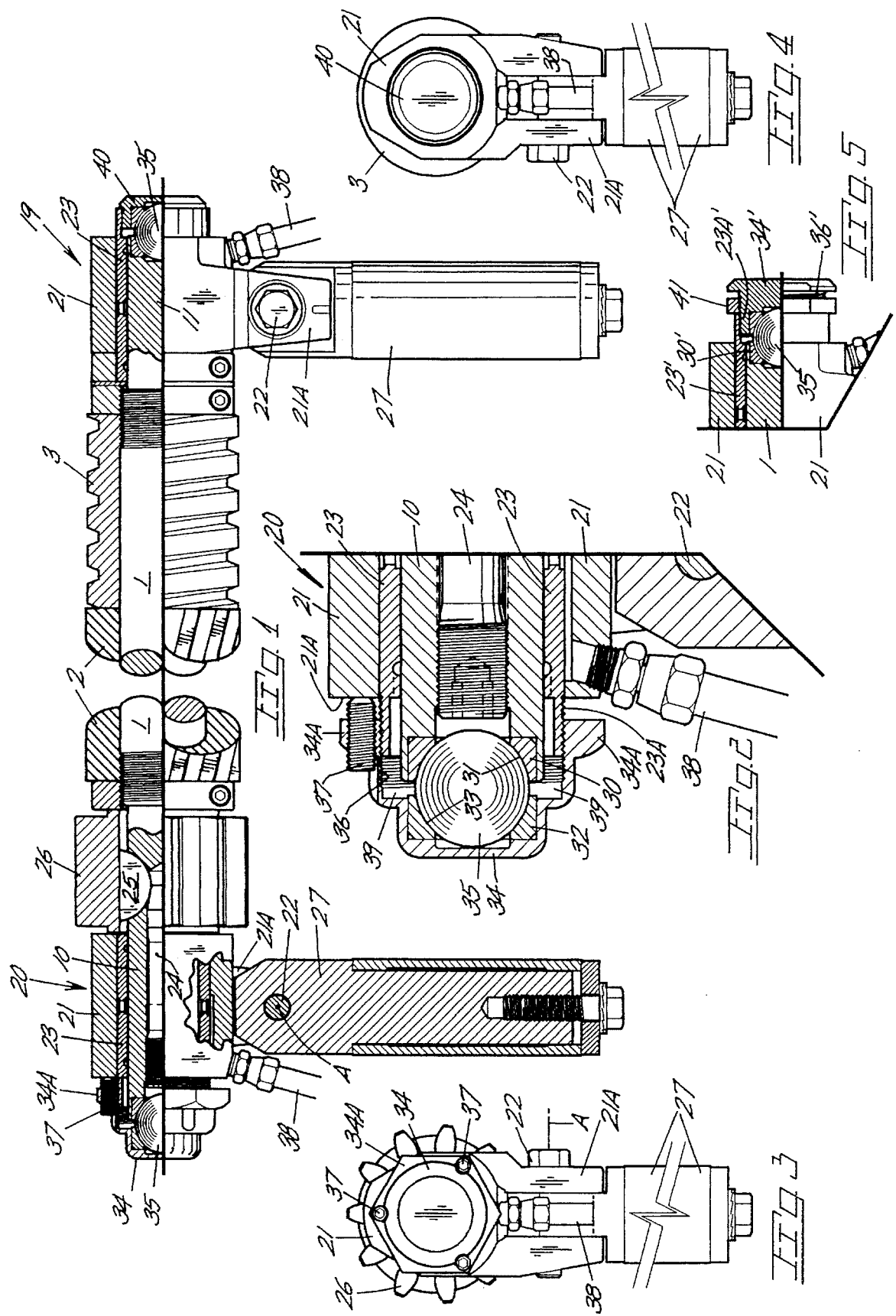

ns lower end of the shaft. The in-feed shaft end as at 10 is a continuation of the shaft 1 while the out-feed shaft end segment 11 may be cylindrical and affixed to the shaft end for rotation therewith.

SHAFT SUPPORTING BEARING ASSEMBLY WITH AXIALLY DISPOSED CAP AND BALL MEMBER

BACKGROUND OF THE INVENTION

The present invention pertains generally to bearing construction for a live shaft with radial and thrust loads borne by a ball element.

In the food processing industry, machines are utilized to remove husks and debris from food articles. Such machines utilize pairs of counter rotating powered shafts, each shaft equipped with tubular rolls. Such cooperating shafts are driven at high speed and encounter substantial loads as the rolls engage the food article. Typically in a husking machine operation ears of corn are continuously deposited on the powered shafts in random fashion with the counter rotating shafts and husking rolls thereon stripping away the husks by a pinching action. Similar machines are used in other food processing efforts, as for example, in the stripping of stems from citrus fruit. A husking machine is shown in U.S. Pat. No. 4,278,097 incorporated herein by reference.

Banks of such machines are used in large food processing plants and during harvest time operate three work shifts six or seven days a week. Additionally, the problem of wear is accentuated by the environment in which the machines operate, e.g., both moisture and grit act on shaft and bearing surfaces. The shut down of such a machine at peak harvest time is particularly undesirable as a backlog readily occurs in product flow with loss of production and man hours.

Another factor in the wear of shafts and bearings of husking machines is that the shafts carrying the husking rolls operate in an inclined position with the shaft ends encountering substantial thrust loads. To alleviate wear of machines equipped with prior art type bearing assemblies shaft speed is below the optimum from a production standpoint to reduce the number of costly shutdowns for maintenance and/or repairs. Additionally, prior art bearing arrangements do not lend themselves to precise, convenient adjustment to permit avoidance of shaft play. The use of thrust washers on such shafts is only a partial remedy and results in the disassembly of the shaft and supporting bearings for periodic thrust washer replacement. Helical lands on the husking rolls contribute to axial loading of the roll equipped shafts.

In the citrus industry similar machines are used to remove stems with cooperating rolls on parallel shafts being ideally in pressure free contact to affect efficient removal of stems, etc., from the fruit. Any play in the roll shaft bearings permits pinching and pulling of the debris being removed resulting in roll and gear wear as opposed to debris removal by a biting action of the rolls.

The prior art includes U.S. Pat. No. 4,865,529 which discloses a main shaft of a turbine and turbopump assembly with ball elements axially disposed at the shaft ends. U.S. Pat. Nos. 405,559; 931,069; 935,452; 1,088,839; 2,127,196; 4,265,498; 4,618,273 and 4,805,432 disclose shaft bearings having an axially disposed ball element, some with a screw type adjustment.

SUMMARY OF THE PRESENT INVENTION

The present invention is embodied within a bearing assembly for support of a shaft against radial and thrust loads and using a ball element concentric with the shaft axis.

The bearing assembly includes a housing receiving a shaft end segment with the end segment provided with a spherical bearing ring which receives a bearing of ball shape. A cap adjacent the shaft end adjustably carries a second spherical bearing ring with both bearing rings having spherical surfaces in contact with large areas of the bearing ball. The cap permits infinite axial adjustment of the bearing. Threaded retainer means permits precise loading of the bearing for optimum bearing life as well as periodic inspection for wear. A lock is engageable with a circular surface extending about the shaft for locking of the retainer in place in an infinitely adjustable manner.

Important objectives of the present invention include the provision of bearing means for supporting a shaft end with a ball element at a shaft closed end for transfer of radial and thrust loads to relatively large spherical surface areas to greatly enhance bearing life; the provision of bearing assemblies supporting a shaft with at least one of the bearing assemblies including provision for bearing adjustment and locking of spherical bearing components in a precise manner for maximum bearing life; the provision of a sealed bearing assembly for supporting the shaft ends utilizing a ball element and an axially adjustable threaded cap having a locking element engageable with an annular housing surface of the bearing assembly; the provision of a bearing assembly utilizing a closure at the shaft end in threaded adjustment with a bearing housing and means locking the retainer relative to the housing at any selected point through 360° for optimum adjustment of the bearing; the provision of a bearing assembly wherein a ball element in conjunction with bearing rings serve to support a shaft end in a contamination free sealed chamber charged with a lubricant.

BRIEF DESCRIPTION OF THE DRAWINGS

In the accompanying drawings:

FIG. 1 is a side elevational view of a roll assembly of a husking machine with fragments broken away and showing the present bearing assembly;

FIG. 2 is an enlarged fragmentary elevational view of the bearing assembly at the left hand end of FIG. 1;

FIGS. 3 and 4 are end elevational views of the left and right ends of FIG. 1 respectively; and FIG. 5 is a fragmentary view of a modified form of bearing assembly.

DETAILED DESCRIPTION OF THE PREFERRED EMBODIMENTS

With continuing attention to the drawings in which reference numerals indicate parts similarly hereinafter identified, the reference numeral 1 indicates a shaft of a husking machine such as that disclosed in the U.S. Pat. No. 4,278,097 incorporated herein by reference. Tubular roll elements as at 2 are disposed end-to-end along shaft 1. In a husking machine powered roll assemblies are used in pairs with tubular roll elements 2 in place on the shaft 1 of one assembly counterrotating in pressureless contact against the tubular of roll elements of the other roll assembly. A tubular discharge spiral roll element 3 on the shaft propels waste and product past the end of the shaft. While the present invention is described in conjunction with the roll equipped shaft of a husking machine used in the removal of extraneous material such as corn husks from a food article, it will be understood that the present invention is not limited to any specific application but may be utilized in various other machine applications.

Roll shaft end segments at 10 and 11 indicate the in-feed and out-feed ends of shaft i with articles deposited adjacent the in-feed ends of a pair of roll shafts for travel lengthwise of a cooperating pair of roll assemblies. Each shaft is equipped with several tubular roll elements 2 which jointly act on articles to strip same of extraneous material.

Bearing assemblies generally at 19 and 20 support the out-feed and in-feed ends 10 and 11 of shaft 1. The following description is of assembly 20 with differences noted as follows in the description. A bearing housing 21 has a clevis shaped lower portion 21A to receive a fastener assembly 22 for adjustable support of the housing about a horizontal axis at A. A bushing 23 receives shaft end segment 10. The end segment may be bored and internally threaded to receive a key lock 24 acting on a key 25 coupling a spur gear 26 to the shaft. Key lock 24 and key 25 are the subject of U.S. Pat. No. 4,929,118 issued to the present inventor. A post at 27 permits positioning of housing 21 about an upright axis.

The present bearing assembly includes a bearing ring 30 having a spherical bearing surface 31 with bearing ring 30 inset within the end of shaft 1 in a friction fit therewith. A companion or second bearing ring at 32 is confined within a cap 34 offset from the shaft end with spherical bearing surface 31 and 33 receiving a ball element 35. Cap 34 is internally threaded at 36 for threaded engagement with a protruding threaded end 23A of bushing 23 of bearing assembly 20 to provide adjustable retention means. Positioning of cap 34 on bushing threads 23A enables pre-loading of ball element 35 and bearing rings 30 and 32 in an infinite manner. A locking element at 37, shown as a set screw, extends from a cap flange 34A into engagement with housing 21 of the bearing assembly and annular face 21A thereof normal to the shaft axis for infinite engagement of locking element 37 through 360°. Multiple locking elements 37 may be utilized to assure access to at least one locking element when remaining locks may not be accessible. As cap 34 permits infinite axial loading of the ball element associated therewith, the remaining ball element at the opposite end of the shaft in the remaining bearing assembly 19 is simultaneously adjusted to permit a closure at 40 to be in frictional engagement with bushing 23. In certain applications it may be desired that both shaft end segments be fitted with a cap as at 34 and a threaded bushing to permit convenient bearing adjustment from either shaft end.

A lubrication line 38 supplies the inner surface of bearing bushings 23 with additional lubricant delivered via a bushing groove to closed internal areas 39 typically shown in FIG. 2 to at all times ensure a sealed lubricant supply.

In a roll equipped machine of the present type used in the food processing industry to remove corn husks or as a precleaner for stripping debris from citrus fruits, carrots, etc., counterrotating roll elements 2 on adjacent shafts 1 will be in close proximity to effect contact or bite between cooperating roll elements on adjacent shafts, and accordingly, bearing assemblies at 19 and 20 must be of a compact nature. The present bearing assembly permits such close proximity while providing an extremely durable bearing arrangement in view of the bearing rings being in contact with relatively large surface areas of each ball element. Shaft end segments 10 and 11 are additionally supported within bushings 23 which is subjected to radial loads only after wear has occurred to the bearing rings. Heretofore, in certain food processing industries, conventional bearings required refurbishment on an annual basis in view of the harsh operating conditions. The present bearing assembly greatly extends bushing life and avoids costly down time due to excessive bearing and resulting increased roll wear.

In FIG. 5 a modified bearing assembly is shown wherein a bushing 23' is internally threaded at 23A' to receive a cap 34' externally threaded at 36'. A lock nut at 41 constitutes a locking element. The cap 34' carries a bearing ring while a companion bearing ring at 30' is seated in the end of shaft 1. Accordingly pre-loading of the bearing assembly in an infinite manner is achieved by adjustment of cap 34' with locking element 41.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. A bearing assembly for supporting a shaft against radial and thrust loads and including, a housing having a bushing to receive the shaft, a first bearing ring for installation in the shaft end, a cap offset from said one end of said shaft, a second bearing ring housed in said cap, a ball element carried by said first and second bearing rings and concentric with said shaft whereby radial and thrust loads applied to said shaft are borne by said ball element and said first and second bearing rings, and bearing adjustment means on said cap and said housing, and a locking element carried by said cap for seated engagement with said housing.

2. The bearing assembly claimed in claim 1 wherein said adjustment means includes screw threads to enable axial adjustment of the cap relative said housing.

3. The bearing assembly claimed in claim 2 wherein said cap and said bushing are provided with said screw threads.

4. The bearing assembly claimed in claim 1 wherein said housing has an annular face normal to the shaft axis and said locking element embodied in a set screw for contact with said face.

5. The bearing assembly claimed in claim i wherein said bearing rings are coaxially spaced along an extended axis of the shaft, each of said bearing rings having a spherical surface.

6. The improvement claimed in claim 1 wherein said bushing includes a threaded segment, said cap in threaded engagement with said bushing.

7. In a bearing assembly for supporting a shaft against radial end thrust loads, the improvement comprising, a bearing housing including a bushing and having an end surface disposed substantially normal to the axis of the shaft, first and second bearings each having a spherical inner surface, a ball element in engagement with the spherical inner surface of each of said first and second bearings, a cap housing one of said bearings and in threaded engagement with said bearing housing, and a locking element carried by said cap and engageable with said end surface of the bearing housing to lock the cap in place subsequent to adjustment of the bearing assembly.

8. A bearing assembly for supporting a shaft against radial and thrust loads and including, a housing including a threaded segment through which the shaft extends, a first bearing ring for installation in the shaft end, a cap offset from said end of said shaft, a second bearing ring housed in said cap, said cap in threaded engagement with said threaded segment, a ball element carried by said first and second bearing rings and concentric with said shaft whereby radial and thrust loads applied to said shaft are borne by said ball element and said first and second bearing rings, and a cap locking element carried by said cap for seated engagement with said housing.

9. The bearing assembly claimed in claim 8 wherein said housing has an annular face normal to the shaft axis and said cap locking element embodied in a set screw for contact with said face.

10. The bearing assembly claimed in claim 8 wherein said housing has a face normal to the shaft axis and said cap locking element embodied in a lock nut.

* * * * *